United States Patent
Neumann et al.

(10) Patent No.: US 12,165,300 B2
(45) Date of Patent: Dec. 10, 2024

(54) METHOD FOR PRODUCING A BRIGHTNESS CORRECTION IMAGE AND APPARATUS

(71) Applicant: CARL ZEISS MICROSCOPY GMBH, Jena (DE)

(72) Inventors: Markus Neumann, Unterschleißheim (DE); Corinna Sommer, Munich (DE); David Knipp, Branneburg (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 430 days.

(21) Appl. No.: 17/658,953

(22) Filed: Apr. 12, 2022

(65) Prior Publication Data

US 2022/0335581 A1 Oct. 20, 2022

(30) Foreign Application Priority Data

Apr. 19, 2021 (DE) .......................... 102021203872.7

(51) Int. Cl.
*G06T 7/00* (2017.01)
*G01N 21/64* (2006.01)
(Continued)

(52) U.S. Cl.
CPC .......... *G06T 5/94* (2024.01); *G01N 21/6458* (2013.01); *G02B 21/0032* (2013.01);
(Continued)

(58) Field of Classification Search
CPC .......... G06T 2207/20024; G06T 11/60; G06T 7/0012; G06T 15/10; G06T 17/00;
(Continued)

(56) References Cited

U.S. PATENT DOCUMENTS

| | | |
|---|---|---|
| 9,990,752 B2 | 6/2018 | Koga |
| 11,215,806 B2 | 1/2022 | Heupel |

(Continued)

FOREIGN PATENT DOCUMENTS

| | | |
|---|---|---|
| DE | 102014107934 A1 | 12/2015 |
| DE | 102014112002 A1 | 2/2016 |
| DE | 112014006672 T5 | 2/2017 |

OTHER PUBLICATIONS

Peng, et al., "A Basic Tool for Background and Shading Correction of Optical Microscopy Images", Nature Communications; DOI:10.1038/ncomms14836, Jun. 8, 2017, 7 pages.

*Primary Examiner* — Quan M Hua
(74) *Attorney, Agent, or Firm* — Brake Hughes Bellermann LLP

(57) ABSTRACT

Techniques for producing a brightness correction image of an object are disclosed, where at least two correction image tiles of the object are captured as pluralities image pixels and the correction image tiles are combined by calculation. The image data of each correction image tile are captured during a capture duration, and the object is displaced transversely to the optical axis of the detection beam path by at least one image pixel in a first direction during the capture duration of a first correction image tile and by at least one image pixel in a second direction during the capture duration of a further correction image tile, with an angle between the first and second directions being greater than 0° and no more than 90°.

8 Claims, 3 Drawing Sheets

(51) Int. Cl.
  *G02B 21/00*     (2006.01)
  *G02B 21/36*     (2006.01)
  *G06T 5/50*      (2006.01)
  *G06T 5/94*      (2024.01)
(52) U.S. Cl.
  CPC ......... *G02B 21/365* (2013.01); *G02B 21/367* (2013.01); *G06T 5/50* (2013.01); *G06T 2207/10056* (2013.01)
(58) Field of Classification Search
  CPC ......... G06T 15/00; G06T 17/20; G06T 19/00; G06T 2207/10132; G06T 2207/10016; G06T 11/00; G06T 2207/10024; G06T 2207/10116; G06T 2207/20021; G06T 5/40; G06T 7/0006; G06T 7/74; G06T 7/248; G06T 19/006; G06T 5/92; G06T 1/00; G06T 11/008; G06V 20/52; G06V 10/20; G06V 20/30; G06V 20/95; G06V 30/10; G06V 30/127; G06V 10/60; G06V 20/64; G06V 10/141; G06V 10/235; G06V 10/24; G06V 10/46; G06V 20/69; G06V 2201/06; G06V 40/107; G01N 2021/1776
  See application file for complete search history.

(56) References Cited

U.S. PATENT DOCUMENTS

| | | | |
|---|---|---|---|
| 2014/0139427 A1* | 5/2014 | Hirai | H04N 13/302 345/156 |
| 2017/0046591 A1* | 2/2017 | Lee | H04N 23/81 |
| 2017/0336719 A1* | 11/2017 | Winkler | G03F 7/70116 |

* cited by examiner

METHOD FOR PRODUCING A BRIGHTNESS CORRECTION IMAGE AND APPARATUS

CROSS REFERENCE TO RELATED APPLICATION

This application claims priority to German Application No. 102021203872.7, filed Apr. 19, 2021, the disclosure of which is incorporated herein by reference in its entirety.

TECHNICAL FIELD

This disclosure relates to a method for producing a brightness correction image and to an apparatus for carrying out the method.

BACKGROUND

Reducing system-related imaging aberrations is very important in many imaging methods, especially in microscopy. By way of example, such imaging aberrations may arise from the effect of the utilized optical elements in the respective beam paths and due to technical reasons as a result of utilized detectors. Additionally, a sample holder, for example a (cover) slip, an object slide, a base of a Petri dish or a (micro-)titer plate, may for example contribute to imaging aberrations that are not caused directly by an object (sample) to be imaged.

A correction of a brightness differences (shading; shading correction) in the captured images is particularly important. By way of example, this is particularly influential if a number of image tiles (tiles) are captured, which are stitched together to form an overall image. In the process, the individual image tiles overlap by a certain area (overlap region; overlap) so that the image tiles can be stitched with positional accuracy on the basis of the multiply captured image information contained therein. If image tiles have different brightnesses, this is perceived as an error by an observer.

The prior art has disclosed a number of approaches for correcting brightness. In principle, these approaches can be subdivided in two categories: i) reference-based methods and ii) purely computational methods.

The reference-based methods are based on a reference image (also referred to as brightness correction image, correction image below), for example of homogenous sample, which should lead to a homogenous signal. Imaging aberrations that occur regardless are contained in the reference image, and so captured images of a sample can be corrected by virtue of subtracting the reference image therefrom. Numerous procedures are known for the purposes of producing a reference image (e.g., DE 10 2014 112 002 A1).

Instead of a reference image, the purely computational methods use the already captured images of a sample which contain imaging aberrations. One example of such an approach is offered by the BaSiC tool (Peng et al, 2017) software.

SUMMARY

Reference-based correction methods are intended to be emphasized below.

So-called camera-based brightness corrections may be implemented as holistic corrections, for example. In the process, a sample holder such as an object slide, for example, is positioned in the beam path such that a region without a sample is captured. The optical conditions correspond to those during the sample capture. By way of example, the chosen region contains the same coverslip and embedding medium as the sample. A captured image of this region can subsequently be used as reference image. This procedure is specific to the currently utilized objective lens and is used, in particular, for conventional image captures in transmitted light.

The just described correction can be carried out for each individual channel in multi-color experiments, for example, and finds particular application in the correction of reflected-light fluorescence recordings.

Modifications of the correction methods described can be applied in many ways. By way of example, it is possible to capture a plurality of image tiles of a sample-free region of the object slide and to form a mean value, for example, in order to eliminate sample contamination present in the image or in order to compensate for variances between the image tiles. This procedure can be implemented in channel-specific fashion.

It is also possible to capture a plurality of image tiles of a sample and to determine a reference image therefrom. In this case, the assumption is made that image structures are canceled, for example, within the scope of forming a mean value, and only the information regarding shading remains. This procedure is applied for complicated or complex fluorescence images, in particular, and requires many image tiles, usually more than 200 titles. This requires an object slide with the desired fluorophore and a sample whose size permits the capture of sufficiently many image tiles. A channel-specific correction is also possible in this case.

In another variant, the sample is focused on, and the object slide is then removed from the beam path. At least one image of the "free space" is captured and used as a reference image.

Particular challenges arise when correcting fluorescence images in which a sample to be imaged is marked by molecules which are excitable to fluorescence (fluorophores). In this case, inherent structures of the sample should be prevented in a reference image from being expressed in said reference image. Moreover, there should be, if possible, no bleaching during the production of the reference image which could lead to deviations in the optical conditions between the creation of the reference image and the sample capture.

The techniques described herein are based on the object of proposing a further option for producing a reference image, by means of which the disadvantages of the prior art are reduced.

The object is achieved by means of a method for producing a brightness correction image and an apparatus for carrying out the method. Advantageous developments are set out in the claims.

To produce a brightness correction image, at least two correction image tiles of the object are in each case captured as a plurality of image pixels. Thus, each image tile is composed of a plurality of image pixels (picture elements). The correction image tiles are combined by calculation to form a brightness correction image.

The techniques described herein are characterized in that the image data of each correction image tile are captured during a capture duration, and the object is displaced transversely to the optical axis of the detection beam path by at least one image pixel in a first direction during the capture duration of a first correction image tile and displaced transversely to the optical axis of the detection beam path by at least one image pixel in a second direction during the capture duration of a second correction image tile, the smaller of the angles included by the first and second direction being between 0° and ≤90°, advantageously between 45° and up to 90°.

The capture duration specifies a time duration during which an image, in particular, a correction image tile, is captured by means of the detector. In this case, the capture duration can be the duration of a frame and/or the opening duration of a detector shutter. Thus, depending on the detection beam path and detector, the capture duration may be determined by the temporal control of the readout of the detector elements of the detector or mechanically and electronically by an opening and closing of the detection beam path in particular, and may be set in this respect. Light sources used to illuminate the object without mechanical shadowing (without a "shutter") may also be connected. The illumination can be implemented in reflected light, for example, to excite fluorescence radiation, or in the bright field, in particular in transmitted light.

The relative movement between object and detection beam path can be brought about by means of an adjustable sample stage and/or by pivoting or displacing the detection beam path. Advantageously, the relative movement is produced by a motor and brought about by a movement of the sample stage.

The techniques described herein use the effect of blurring or smearing image structures present. To this end, deliberate blurring of the correction image tiles is produced by virtue of the object being moved so significantly during the capture duration that sharp imaging of structures of the object no longer occurs.

Since a singular movement in a first direction or a second direction leads to the formation of stripes in the captured correction image tiles, the two directions are advantageously angled at at least 45° with respect to one another in order to likewise blur, with a high reliability, the stripe formations contained in the result of the combination of at least two correction image tiles by calculation.

The brightness correction image obtained from a combination by calculation of the at least two correction image tiles can subsequently be used for correcting captured images of a sample.

To attain a sufficient quality of a brightness correction image to be used in actual fact, a currently available brightness correction image can be analyzed and can be assessed in respect of a quality criterion defined in advance. If the quality criterion is not satisfied, the currently present brightness correction image can be combined by calculation with a further image of the object. Optionally, this step can be repeated until the quality criterion has been satisfied. The variance of the brightness correction image is a possible quality criterion. The object is to produce a low-variance brightness correction image, in which there therefore is a uniform distribution of brightness intensity values.

It is also possible to capture further correction image tiles and produce a new brightness correction image therefrom, optionally also using the previous brightness correction image. In this case, too, the process can be terminated once the variance of the brightness correction image is sufficiently small, for example.

The capture duration, that is to say, the period of time during which a correction image tile is captured in each case, and/or the angle between the first and second direction can be chosen, optionally while taking account of a respective predefined admissible range. In this way, the parameters during the capture of the correction image tiles can be adapted to the current requirements and/or to the results of the check of the quality criterion. The capture of further correction image tiles can be completed if, for example, a desired variance of the brightness correction image is attained. To this end, a control loop can be implemented between a detector, an evaluation unit and a control unit. Depending on the image data captured by the detector and the results of the evaluation unit that analyzes the image data, it is possible to transmit information to the control unit which, in turn, generates control commands on the basis of the information, an illumination, a movement of the sample stage and/or settings of the detector, in particular the capture duration in relation to the movement direction and/or movement speed of the sample stage, for example, being set in controlled fashion by means of said control commands.

The correction image tiles in the first and second direction, respectively, may image the same regions of the object. In further configurations of the method, it is also possible to image partly different or entirely different regions of the object.

In principle, the techniques described herein can be used for any microscopy method where contrasts are exploited. Therefore, a sample holder can be chosen as an object, for example, to reduce system-related imaging aberrations. The method can be used particularly advantageously in fluorescence microscopy. A sample having molecules emitting detection radiation to be captured, for example, fluorophores, is chosen as an object in this case.

The correction image tiles can be produced by virtue of drives of the sample stage being driven by hand or by means of generated control commands. Image capture can be implemented while the detector is controlled to capture a frame, that is to say, the captured image data are assigned to a single image. It is also possible that a shutter placed in front of the detector is opened (for example, mechanically or electronically) during the respective capture duration. The object can be illuminated continuously or only during the capture duration. The latter serves to spare the object, for example, to reduce unwanted bleaching.

The apparatus for carrying out the techniques described herein serves to capture images of an object present on an adjustable sample stage in a sample chamber and comprises a detection beam path, a detector unit and a control unit for generating control commands. The control unit is configured to generate control commands.

A mode of operation for producing a brightness correction image can be implemented by means of the control commands. Therein, the sample stage is displaced by at least one image pixel in a first direction transversely to the optical axis of the objective or detection beam path while a first correction image tile of the object is recorded and displaced by at least one image pixel in a second direction transversely to the optical axis of the objective or detection beam path while a second correction image tile of the object is recorded. In this case, the smaller of the angles included by the first and second direction is more than zero degrees and no more than 90. Advantageously, the value of the angle is between 45° and 90°. It is also possible in further configurations for there to be a switch between a first direction, second direction, and, optionally, at least one further direction during a recording of a correction image tile. A switch between the respective directions can be implemented according to a fixed scheme. In further configurations, a switch of direction may happen randomly.

Therefore, the method may also serve to generate a corrected image. In this case, a plurality of image tiles of an object may be captured, with each image tile being captured as a plurality of image pixels and each image tile overlapping in terms of area with at least one further captured image tile in an image tile overlap region with a defined minimum size. A resultant image is produced by virtue of a stitching the image tiles together, the image data of the multiply captured image pixels of the overlap regions being used to arrange the tile images at the correct position and with the correct orientation relative to one another. Each captured image tile and/or the resultant image is corrected by means of a brightness correction image, each image pixel of the image tiles and/or of the resultant image being combined by calculation with image data from corresponding pixels of the brightness correction image.

A brightness correction image produced according to the invention can potentially be used in all contrast-based microscopy methods, and is particularly suitable for fluorescence microscopy and bright-field microscopy, in particular in the transmitted light bright field. Use is also possible in methods where no overlapping image tiles are captured and combined by calculation.

BRIEF DESCRIPTION OF THE DRAWINGS

The techniques described herein are explained in more detail below on the basis of drawings, in which.

DETAILED DESCRIPTION

Figure 1:
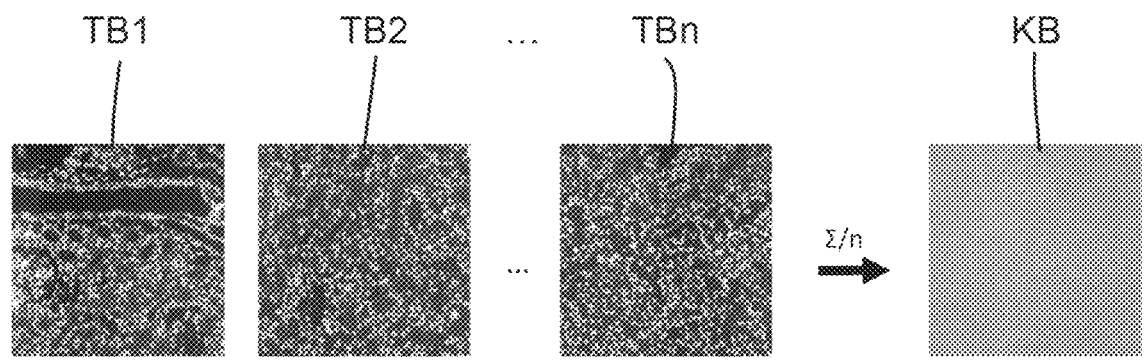
FIG. 1 shows a schematic example of producing a brightness correction image in accordance with the prior art.

A method known from the prior art for producing a brightness correction image KB (also referred to as a correction image KB for short) is illustrated very schematically in FIG. 1. A number of (correction) image tiles TB1, TB2 to TBn are captured, and the respective pixels of the image tiles are combined by calculation by applying different mathematical methods (symbolized by the character sequence: Σ/n), optionally to be selected, for example, averaged, and this is used to create the correction image KB. It is evident that the correction image KB has a smaller variance in its brightness intensity values and appears more homogeneous than is the case for the first image tile TB1, for example.

Figure 2:
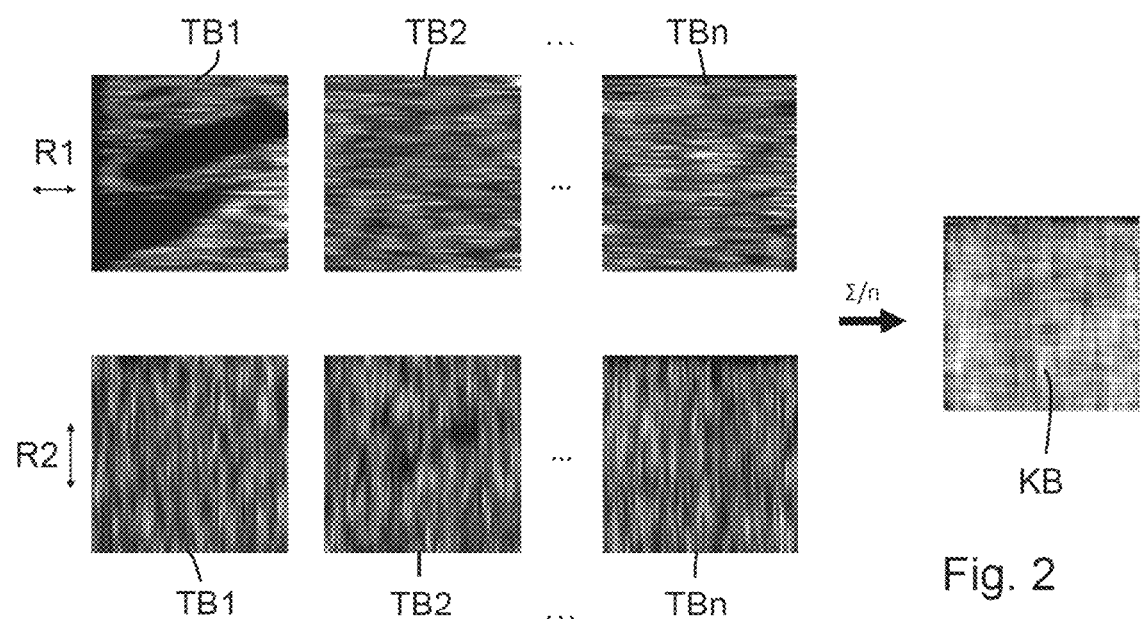
FIG. 2 shows a schematic representation of a configuration of the method according to the invention.

An implementation of a method according to the invention is depicted in FIG. 2. The upper row shows a first to n-th correction image tile TB1 to TBn, which were captured while the object 2 was displaced in a first direction R1 (see FIG. 3) during a capture duration of the detector 5. In exemplary fashion, the lower row shows a first to n-th correction image tile TB1 to TBn, which were captured in a second direction R2. In this case, each correction image tile TB1 to TBn has, for example, a respective variance with a value ranging from 18 to 80, while the variance of the generated brightness correction image KB is only 3, for example.

Figure 3:
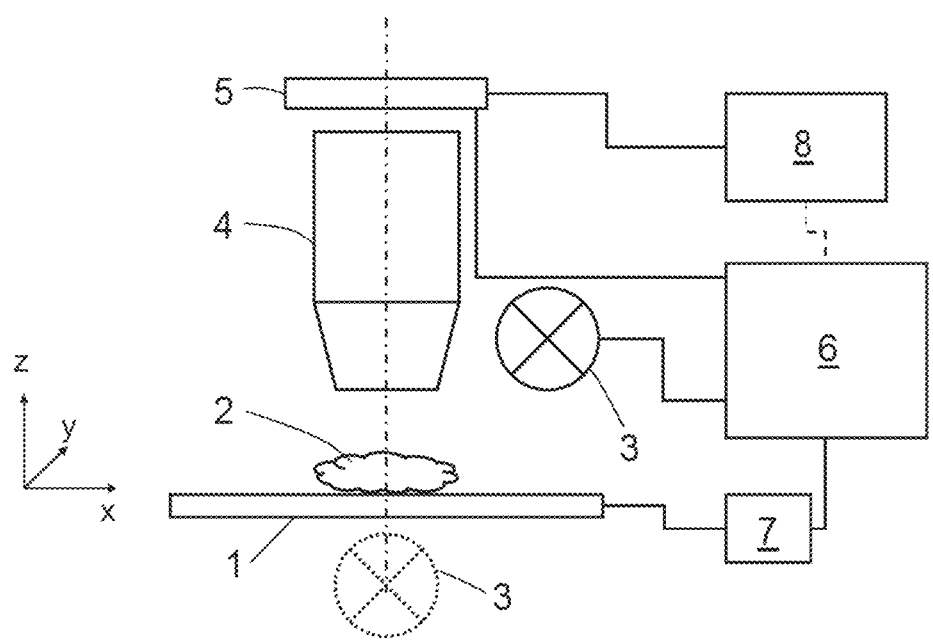
FIG. 3 shows a schematic representation of an exemplary embodiment of an apparatus according to the invention.

The first direction R1 and the second direction R2 are located in a common plane and include an angle of 90° in this exemplary embodiment. By way of example, the common plane is an xy-plane that is parallel to a sample stage 1 (FIG. 3).

The image tiles TB1 to TBn captured in the respective directions R1, R2 are combined by calculation, for example, averaged, and combined by calculation to form a brightness correction image KB.

In this case, the image tiles TB1 to TBn captured in one of the directions R1 or R2 may be combined by calculation in order then to combine the resultant image (not shown) by calculation with a result image of the image tiles TB1 to TBn captured in the other direction R1 or R2 in order to form the brightness correction image KB.

It is also possible to, in each case, combine image tiles TB1 to TBn of the first and second direction R1, R2 by calculation. By way of example, the first image tiles TB1 of the first and second direction R1, R2 are combined by calculation. The result image obtained can be combined by calculation with a result image of, for example, the second image tiles TB2 of the first and the second direction R1, R2, etc.

Further, it is possible that result images of the image pairs TB1, TB2 to TBn of the first and second direction R1, R2 are produced in each case. The correction image KB is then determined from the result images. Depending on whether all result images are used and/or whether different weightings are used for individual result images, this variant leads to a different correction image KB than the procedures outlined above.

The object is to obtain a brightness correction image KB with a small variance, that is to say, with a quite homogeneous distribution of the intensity values, in which structures of the sample per se are no longer present. Errors possibly present in the object or in the beam path should be largely compensated for and no longer lead to structuring in the brightness correction image KB.

An exemplary embodiment of an apparatus for carrying out the method according to the invention is depicted schematically in FIG. 3. A sample 2 can be arranged on a controllably adjustable sample stage 1. It is illuminated by means of the light source 3. Detection radiation emanating from the sample 2, for example fluorescence radiation and/or reflected components of the illumination radiation, are registered by means of an objective lens 4 and imaged along an optical axis (symbolized by a dashed line) in the direction of a z-axis on a spatially resolved detector 5, for example a CCD, CMOS or sCMOS chip, a SPAD (single photon avalanche diode) array or an array of a plurality of PMTs (photomultiplier tubes). The image data captured by means of the detector 5 are transmitted to an evaluation unit 8 and combined by calculation there to form a correction image KB.

In alternative embodiments of the apparatus, the illumination can be implemented with transmitted light, that is to say for example in the bright field, by means of the light source 3 then positioned appropriately (shown in exemplary and optional fashion using dotted lines).

In further exemplary embodiments, the evaluation unit 8 may also implement a correction of captured images of the sample 2, within the scope of which captured image data are combined by calculation with the produced correction image KB.

Moreover, a control unit 6, which may be, for example, in the form of a computer or of an FPGA and which is configured to generate control commands, is present. The control commands are generated in such a way that all of the modes or selected modes described in relation to FIG. 2 can be carried out. The control unit 6 is connected to a drive unit 7 for motor-driven movement of the sample stage 1, to the detector 5 and to the light source 3, in each case in a manner suitable for the transfer of data.

The evaluation unit 8 may be optionally connected to the control unit 6, for example to facilitate, on the basis of the captured image data or on the basis of the degree to which selected quality criterion are fulfilled, an adjustment of the control commands generated there.

LIST OF REFERENCE SIGNS

1 Sample stage
2 Sample, object
3 Light source
4 Objective lens
5 Detector
6 Control unit
7 Drive unit
8 Evaluation unit
TB1, ..., TBn First image tile, ..., n-th image tile
KB Brightness correction image
R1 First direction
R2 Second direction

The invention claimed is:

1. A method of producing a brightness correction image of an object, the method comprising:
    capturing, during a capture duration, image data for at least two correction image tiles of the object, wherein each correction image tile is captured as a plurality of image pixels;
    transversely displacing the object with respect to an optical axis of a detection beam path in a first direction by at least one image pixel during the capturing of image data for a first correction image tile of the at least two correction image tiles;
    transversely displacing the object with respect to the optical axis of the detection beam path in a second direction by at least one image pixel during the capturing of image data for a second correction image tile of the at least two correction image tiles, wherein an angle between the first and second directions is greater than 0° and no more than 90°; and
    combining the correction image tiles by calculation.

2. The method according to claim 1, wherein the object includes a sample holder.

3. The method according to claim 1, wherein the object includes a sample which has molecules emitting a detection radiation.

4. The method according to claim 1, further comprising illuminating the object is illuminated with transmitted light.

5. An apparatus for capturing images of an object, the apparatus comprising:
    a detection beam path;
    an objective lens;
    a detector configured for capturing, during a capture duration, image data for at least two correction image tiles of the object, wherein each correction image tile is captured as a plurality of image pixels;
    an adjustable sample stage in a sample chamber, wherein the adjustable sample stage is configured for holding an object and is configured for transversely displacing the object with respect to an optical axis of the detection beam path in a first direction by at least one image pixel during capturing of image data for a first correction image tile of the at least two correction image tiles, and for transversely displacing the object with respect to the optical axis of the detection beam path in a second direction by at least one image pixel during the capturing of image data for a second correction image tile of the at least two correction image tiles, wherein an angle between the first and second directions is greater than 0° and no more than 90°; and
    an evaluation unit configured for combining the captured image data to form a brightness correction image.

6. The apparatus according to claim 5, wherein the object includes a sample holder.

7. The apparatus according to claim 5, wherein the object includes a sample which has molecules emitting a detection radiation.

8. The apparatus according to claim 5, further comprising a light source configured for illuminating the object with transmitted light.

* * * * *

UNITED STATES PATENT AND TRADEMARK OFFICE
CERTIFICATE OF CORRECTION

| | | |
|---|---|---|
| PATENT NO. | : 12,165,300 B2 | Page 1 of 1 |
| APPLICATION NO. | : 17/658953 | |
| DATED | : December 10, 2024 | |
| INVENTOR(S) | : Neumann et al. | |

It is certified that error appears in the above-identified patent and that said Letters Patent is hereby corrected as shown below:

On the Title Page

Column 1, in Item (72), in "Inventors", Line 3, delete "Branneburg" and insert -- Brannenburg --, therefor.

Signed and Sealed this
Eighteenth Day of February, 2025

Coke Morgan Stewart
*Acting Director of the United States Patent and Trademark Office*